United States Patent
Harlos et al.

[11] Patent Number: 6,072,539
[45] Date of Patent: Jun. 6, 2000

[54] METHOD AND ARRANGEMENT FOR STEEPENING COLOR EDGES

[75] Inventors: Hartmut Harlos, Hamburg; Frank Volmari, Rellingen, both of Germany

[73] Assignee: U.S. Philips Corporation, New York, N.Y.

[21] Appl. No.: 08/928,798

[22] Filed: Sep. 12, 1997

[30] Foreign Application Priority Data

Sep. 26, 1996 [DE] Germany .................. 196 39 572

[51] Int. Cl.$^7$ .................. H04N 9/64; H04N 9/68
[52] U.S. Cl. .................. 348/625; 348/630; 348/631; 358/37; 382/266
[58] Field of Search .................. 348/625, 606, 348/627, 628, 629, 630, 631, 638, 641, 644, 645, 653, 654, 659, 661, 662; 382/266, 267, 268, 269, 270, 271, 272, 273, 274, 275; 358/37; H04N 9/64, 9/68

[56] References Cited

U.S. PATENT DOCUMENTS

| | | | |
|---|---|---|---|
| 4,581,631 | 4/1986 | Sonnenberger | 358/37 |
| 4,729,014 | 3/1988 | Flamm | 348/630 |
| 4,931,858 | 6/1990 | Honjo | 348/628 |
| 5,038,206 | 8/1991 | Ubukata | 348/631 |
| 5,191,407 | 3/1993 | Kawano | 348/630 |
| 5,231,317 | 7/1993 | Mitelberg | 307/517 |
| 5,374,964 | 12/1994 | Rzeszewski | 348/625 |
| 5,581,306 | 12/1996 | Ohara | 348/625 |

OTHER PUBLICATIONS

Philips Semiconductors, Integrated Circuits, Preliminary Specification, SAA4700, VPS dataline processor, Mar. 1991.
Philips Semiconductors, Integrated Circuits, Preliminary Specification, SAA4970T, Economical video processing IC (ECOBENDIC), Oct. 25, 1996.
Philips Semiconductors, Integrated Circuits, Preliminary Specification, SAA7158, Back END IC, Jul. 1994.

*Primary Examiner*—Mark R. Powell
*Assistant Examiner*—Wesner Sajous
*Attorney, Agent, or Firm*—Edward W. Goodman

[57] ABSTRACT

A method and arrangement for steepening the edges of a color signal, in which a control signal is generated which is obtained by differentiation, rectification and subsequent differentiation of the rectified first differentiation, and is temporarily assigned to the color signal, and in which, in dependence upon the control signal, chrominance values of reference pixels of the color signal are copied on edge pixels of the color signal in such a way that the chrominance values of reference pixels preceding the edge pixels are copied on the edge pixels in the case of a positive control signal and the chrominance values of reference pixels following the edge pixels are copied on the edge pixels in the case of a negative control signal, false chrominance values of pulses which are steepened are prevented in that a chrominance value of a reference pixel is copied on an edge pixel only when the values of the control signal in the assigned region between the reference pixel and the edge pixel do not have a zero crossing.

7 Claims, 2 Drawing Sheets

METHOD AND ARRANGEMENT FOR STEEPENING COLOR EDGES

BACKGROUND OF THE INVENTION

1. Field of the Invention

The invention relates to a method of steepening the edges of a color signal, in which method a control signal is generated which is obtained by differentiation, rectification and subsequent differentiation of the rectified first differentiation, and is temporarily assigned to the color signal, and in which method, in dependence upon the control signal, chrominance values of reference pixels of the color signal are copied on edge pixels of the color signal in such a way that the chrominance values of reference pixels preceding the edge pixels are copied on the edge pixels in the case of a positive control signal, and the chrominance values of reference pixels following the edge pixels are copied on the edge pixels in the case of a negative control signal.

2. Description of the Related Art

Such an arrangement is known from the Philips ICs SAA4970 and SAA7158. In these ICs, the edges of a color signal or two color difference signals in this color signal are steepened by means of two-fold differentiation. The result of the second differentiation is used to copy the chrominance values of pixels preceding an edge, on pixels in the region of the edge in the case of a positive signal, and to copy color pixel values following the edge on pixels in the region of the edge in the case of a negative signal. This leads to steeper edges. Moreover, a "Hill" protection is performed, serving the purpose of minimally distorting very narrow pulses. This Hill protection ensures that, at zeros of the first differentiation, the copying process is not performed beyond the zero. In spite of this Hill protection, the problem occurs in this arrangement that, for example, for neighboring pulses having different chrominance values, these values may be mixed, due to the above-described copying process, in the transition region between the two pulses. For example, color pixel values of a first red pulse are transmitted from its final region to the initial region of a subsequent green pulse, and conversely. The colors are then mixed in a clearly visible way, or colors appear in a region which is actually colorless.

SUMMARY OF THE INVENTION

It is an object of the invention to provide a method and an arrangement in which this problem does not occur, but yields a satisfactory result of color edge steepening.

According to the invention, this object is solved in that a chrominance value of a reference pixel is copied on an edge pixel only when the values of the control signal in the assigned region between the reference pixel and the edge pixel do not have a zero crossing.

In the method according to the invention, the color signal is first differentiated. After this first differentiation, the result of this differentiation is rectified. This rectified signal is then differentiated again. This signal will hereinafter be referred to as control signal.

Dependent on the control signal, chrominance values of reference pixels are copied on edge pixels in known manner. In the case of a positive control signal, chrominance values of reference pixels preceding the edge pixels are copied on these edge pixels. In the case of a negative control signal, chrominance values of reference pixels following the edge pixels are copied on these edge pixels. For example, in the initial region of an edge, chrominance values directly preceding this edge are transferred to chrominance values in the initial region of the edge. Conversely, chrominance values of pixels in the region behind the edge are transferred to pixels in the final region of the edge. As a result, the edge is clearly steeper both in its initial region and in its final region, so that, visually, a better impression of definition of the chrominance values is obtained.

According to the invention, this control signal is also used for limiting this copying of chrominance values in given regions of the color signal so as to avoid distortion of pulses and the above-described mixing of colors.

The control signal is temporarily assigned to the original color signal, i.e., each individual value of the control signal is temporarily present in parallel with the corresponding value of the color signal from which it has been obtained by means of twofold differentiation. If a zero crossing of its values occurs in the control signal, the pixel chrominance values are not copied in the assigned color signal beyond this zero crossing. Thus, chrominance values are not copied beyond regions in which the assigned control signal has a zero crossing. In all other regions, the copying process is performed in the manner described above. For example, the above-described copying process can be performed before a zero crossing of the control signal in the final region of an edge. Likewise, the color edges of a subsequent edge may be steepened in the manner described above in an edge region behind this zero crossing. However, copying does not take place beyond the zero crossing of the control signal, i.e., beyond the boundary region between the two edges. The above-described color mixing is thereby prevented.

Within a, for example, relatively narrow pulse, the control signal also has a zero crossing in its central region. Similarly as in the prior art, it is thereby prevented that the shape of the pulse is distorted by the steeper color edges.

An embodiment of the invention is characterized in that the chrominance values of the pixels in the assigned region of the color signal are not copied in a predeterminable region around a zero of the control signal values.

The above-described "prohibited" region for copying processes for the purpose of steepening color edges may be additionally widened around a zero of the control signal. The region beyond which no copying process is performed, can thereby be widened so as to additionally reduce the risk of color mixing, also with very flat pulses.

A second embodiment of the method according to the invention is characterized in that the color signal is present in the form of two color difference signals which are processed separately. The above-described method, according to the invention, is advantageously applicable also when the color signal is present in the form of two color difference signals. The color difference signals are then processed separately in the manner described above, i.e., particularly also the differentiations and the rectification are separately performed for both signals. The method itself is then performed for these color difference signals in the manner as described above.

In a further embodiment of the invention, an arrangement for performing the method is characterized in that the color signal is applied to a first differentiator and a copying circuit, the output signal of the first differentiator is applied to a rectifier whose output signal is applied to a second differentiator which generates the control signal, and a control circuit is provided which, in dependence upon the control signal, changes this signal by means of a copy-limiting circuit in such a way that color data between pixels of the color signal are copied by means of the copying circuit only in those regions of the color signal in which the values of the assigned control signal do not have a zero crossing.

The method described above is advantageously realized by means of this simple arrangement. The control circuit controls the copying processes and the copy-limiting circuit in such a way that the copying process is not performed beyond zero crossings of the control signal.

If the color signal is present in the form of two color difference signals, a further embodiment of the invention is characterized in that a first differentiator, a rectifier and a second differentiator are assigned to each color difference signal. This solution is advantageous because the two color difference signals are steepened in a completely separate way.

However, to simplify the arrangement, a further embodiment of the invention may be characterized in that the color signal is present in the form of two color difference signals, a first differentiator is assigned to each color signal, and the output signals of the two first differentiators are applied to a rectifier preceding a second differentiator.

These and other aspects of the invention are apparent from and will be elucidated with reference to the embodiments described hereinafter.

DESCRIPTION OF THE PREFERRED EMBODIMENTS

Figure 1:
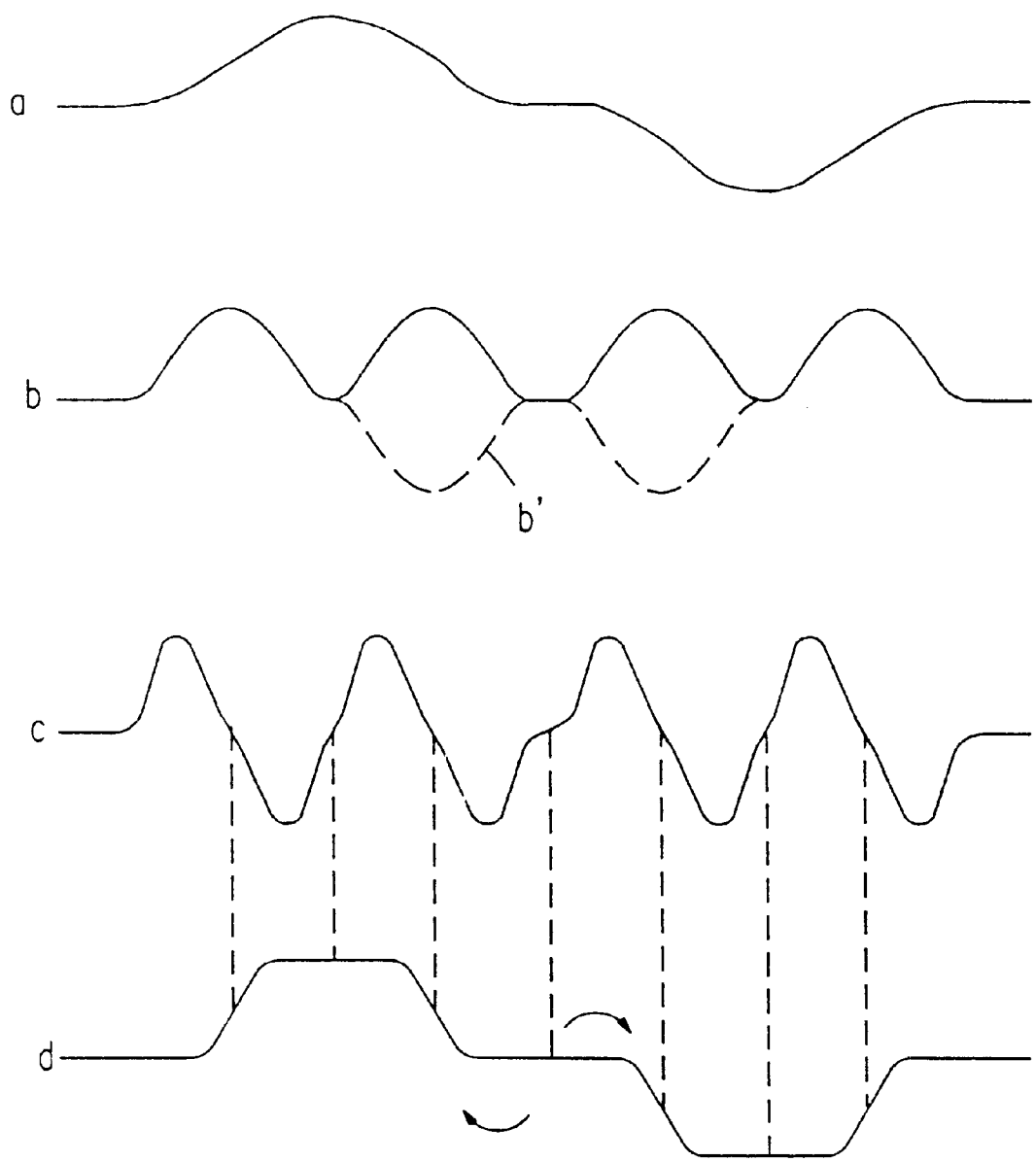
FIG. 1 is a time diagram of a section of a color signal with two color pulses, the generation of the first differentiation of the color signal, its rectification and the subsequent, second differentiation for generating the control signal, and the color signal whose color edges are finally steepened.

The time diagram in FIG. 1 shows a color difference signal of a color signal by way of a curve a. This color difference signal may be, for example, a color difference signal R-Y. A complete color signal is composed of two color difference signals, so that a second color difference signal is present, which is not shown in the Figure but is processed in accordance with the same method.

The curve a of the color difference signal R-Y in FIG. 1 shows a first positive pulse representing red chrominance values. This first positive pulse is directly followed by a second negative pulse which, in this case, represents green chrominance values.

FIG. 1 further shows a curve b which represents the rectified differentiation of the color difference signal in accordance with curve a. The broken-line curve b' represents a signal which is the non-rectified differentiation of the color difference signal shown in curve a.

To generate the control signal, the rectified first differentiation b of the color signal is used. This is shown by means of curve c in FIG. 1. This control signal curve c is obtained by differentiation from the rectified first differentiation in accordance with curve b.

Dependent on the control signal shown by way of curve c in FIG. 1, the color edges of the color difference signal in accordance with curve a in FIG. 1 are steepened. However, also in dependence upon the control signal, this color-edge steepening or the copying processes therefor is limited.

Curve d in FIG. 1 shows the color difference signal of curve a steepened in dependence upon the control signal of curve c. Curve d shows the two pulses of the original color difference signal with clearly steeper edges. The pulses then have a "pure" shape which particularly does not have any ripple. Moreover, chrominance values of the red pulse have not been copied on the green pulse, or conversely.

In the initial region of the first pulse of the signal a, the control signal c has positive values. In this region, chrominance values of reference pixels are copied on edge pixels. The edge pixels are arranged in the initial region of the pulse particularly as far as the center of the leading edge of the pulse. The reference pixels precede the edge of the color difference signal. The control signal c has a zero crossing in the area of the center of the leading edge of the pulse. According to the invention, chrominance values within the color difference signals are not copied beyond this zero crossing of the control signal. Behind this center of the leading edge, the copying process is performed again but this time in the reverse direction because the control signal c has negative values in this region. Thus, in this region, the chrominance values of reference pixels behind the edge are copied on edge pixels in the second part of the leading edge of the pulse. The control signal c again has a zero crossing approximately in the central region of the pulse, with the result that a copying process is neither performed beyond this region. It is thereby achieved that the pulse in the curve d of the steepened signal has a possibly plane pulse shape. If the copying process were not limited at this point, the pulse would have a wavy roof shape.

The trailing edge of the first pulse is dealt with in a corresponding way. In the first region, in which the control signal c has positive values, chrominance values of reference pixels preceding the edge are copied on the initial region of the edge. Conversely, in the second half of the trailing edge, a copying process is performed in the case of a negative control signal c, in which the chrominance values of reference pixels behind the edge are copied on edge pixels in the second region of the trailing edge. Also in this case, no copying process is performed beyond the center of the trailing edge because the control signal c has a zero crossing at that point.

The control signal c also has a zero crossing in the transition region between the two pulses of the color difference signal a. In the region preceding this zero crossing, the control signal has negative values so that color pixels are copied in the way described above for the second part of the trailing edge of the first pulse. The control signal has positive values behind this zero crossing so that chrominance values are also copied for the first part of the leading edge of the subsequent green pulse. However, the copying process is not performed beyond this zero crossing of the control signal c, occurring between the two color pulses. It is thereby ensured that chrominance values of the red pulse are not mixed with those of the green pulse, or conversely. Nevertheless, steeper edges are obtained for the color pulses shown in curve d.

The green pulse following the red pulse in FIG. 1 is dealt with in a corresponding manner, but in this case a negative edge occurs first and, subsequently, a positive edge.

Figure 2:
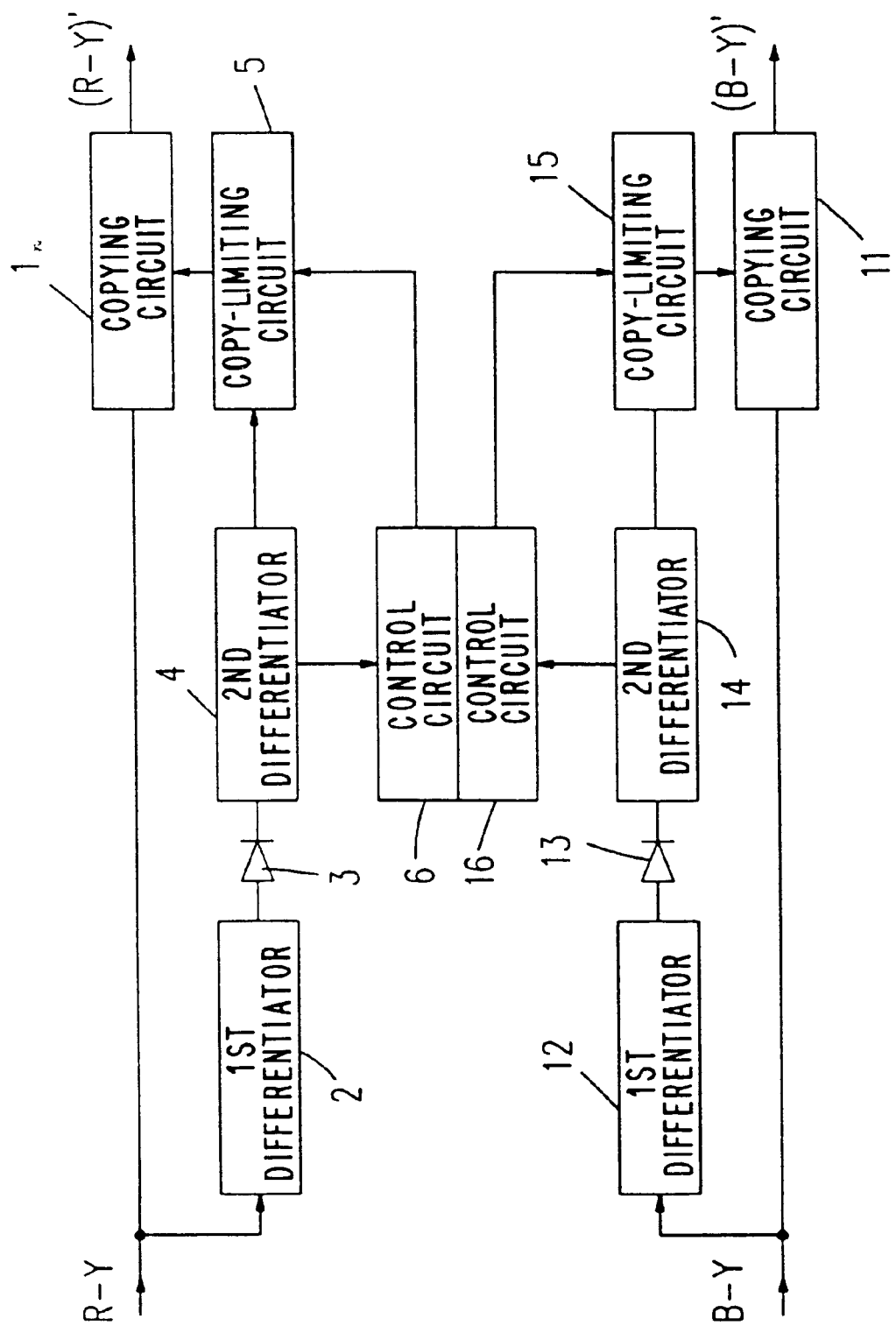
FIG. 2 is a block diagram of an arrangement for performing the method.

FIG. 2 is a block diagram of an arrangement according to the invention, with which the edges of a color signal can be steepened.

In FIG. 2 it is assumed that the color signal is present in the form of two color difference signals R-Y and B-Y.

The color difference signal R-Y is applied to a copying circuit 1 and to a first differentiator 2. The differentiator 2 precedes a rectifier 3 whose output signal is applied to a second differentiator 4. The second differentiator 4 generates the control signal described above, which is applied to a copy-limiting circuit 5 and to a control circuit 6. The copy-limiting circuit 5 controls the copying circuit 1 which supplies the steepened color difference signal (R-Y)' from its output. The circuit elements 1 to 6 are provided only for the color difference signal R-Y.

The color difference signal B-Y is applied in a corresponding manner to a copying circuit 11 and to a first differentiator 12 whose output signal is applied to a second differentiator 14 after rectification by means of a rectifier 13, which second differentiator applies the control signal to a copy-limiting circuit 15 and to a control circuit 16.

By means of the copying circuits 1 and 11, the chrominance values of color pixels are copied separately in the two color difference signals in the manner described above, as is shown, for example, in FIG. 1.

The copying process is controlled by the control circuits 6 and 16, with a separate control being performed for the two color difference signals R-Y and B-Y so that their pulses are processed and steepened separately.

The control circuits 6 and 16 process the control signals of the two second differentiators 4 and 14 in the manner described above and control the copy-limiting circuits 5 and 15 in such a way that no copying processes take place beyond zeros or zero regions of the control signal. In the other regions, copying processes by means of the copying circuits 1 and 11 are performed for corresponding values of the control signal.

Copying without any side effects, and as shown by way of the curves in FIG. 1, can be performed with this relatively simple arrangement.

What is claimed is:

1. A method of steepening edges of a color signal, said method comprising the steps:

generating a control signal by performing the following sub-steps:

differentiating the color signal to form a first differentiated signal;

rectifying the first differentiated signal to form a rectified signal; and differentiating the rectified signal to form a second differentiated signal, wherein the second differentiated signal is the control signal; and temporarily assigning the control signal to the color signal, wherein, in dependence upon the control signal, chrominance values of reference pixels of the color signal are copied on edge pixels of the color signal in such a way that the chrominance values of reference pixels preceding the edge pixels are copied on the edge pixels when the control signal has a positive value, and the chrominance values of reference pixels following the edge pixels are copied on the edge pixels when the control signal has a negative value, characterized in that a chrominance value of a reference pixel is copied on an edge pixel only when the values of the control signal, in an assigned region of the color signal between the reference pixel and the edge pixel, do not have a zero crossing.

2. A method as claimed in claim 1, characterized in that the chrominance values of the pixels in the assigned region of the color signal are not copied in a predeterminable region around a zero value of the control signal.

3. A method as claimed in claim 1, characterized in that the color signal comprises two color difference signals which are processed separately.

4. An arrangement for steepening edges in a color signal, characterized in that said arrangement comprises:

a first differentiator having an input for receiving the color signal;

a copying circuit having an input for also receiving the color signal, an output for supplying a steepened color signal, and a control input;

a rectifier having an input for receiving an output signal of the first differentiator;

a second differentiator having an input for receiving an output signal of the rectifier, said second differentiator generating a control signal;

a copy-limiting circuit having an input for receiving said control signal, an output coupled to the control input of said copying circuit, and a control input; and a control circuit having an input for also receiving said control signal, and an output coupled to the control input of said copy-limiting circuit, wherein said control circuit controls said copy-limiting circuit cause said copying circuit to change the color signal in such a way that said copying circuit copies color data of the control signal to pixels of the color signal only in regions of the color signal when values of the control signal do not have a zero crossing.

5. An arrangement as claimed in claim 4, characterized in that said color signal comprises a first color difference signal and a second color difference signal, said first color difference signal being applied to said first differentiator and to said copying circuit, and said arrangement further comprises a further first differentiator, a further rectifier and a further second differentiator for processing said second color difference signal.

6. An arrangement as claimed in claim 4, characterized in that the color signal comprises first and second color difference signals, said first color difference signal being applied to said first differentiator, and said arrangement further comprises a further first differentiator for receiving said second color difference signal, the output signals of the first and further first differentiators being applied to said rectifier preceding said second differentiator.

7. A picture display device having a display for displaying a color signal, and an arrangement for steepening edges in the color signal, characterized in that said arrangement comprises:

a first differentiator having an input for receiving the color signal;

a copying circuit having an input for also receiving the color signal, an output for supplying a steepened color signal, and a control input;

a rectifier having an input for receiving an output signal of the first differentiator;

a second differentiator having an input for receiving an output signal of the rectifier, said second differentiator generating a control signal;

a copy-limiting circuit having an input for receiving said control signal, an output coupled to the control input of said copying circuit, and a control input; and a control circuit having an input for also receiving said control signal, and an output coupled to the control input of said copy-limiting circuit, wherein said control circuit controls said copy-limiting circuit to cause said copying circuit to change the color signal in such a way that said copying circuit copies color data of said control signal to pixels of the color signal only in regions of the color signal when values of the control signal do not have a zero crossing, the output of said copying circuit being coupled to an input of said display.

\* \* \* \* \*